Jan. 3, 1967   B. R. WANLASS   3,295,390
DRIVE MECHANISM
Filed June 10, 1964
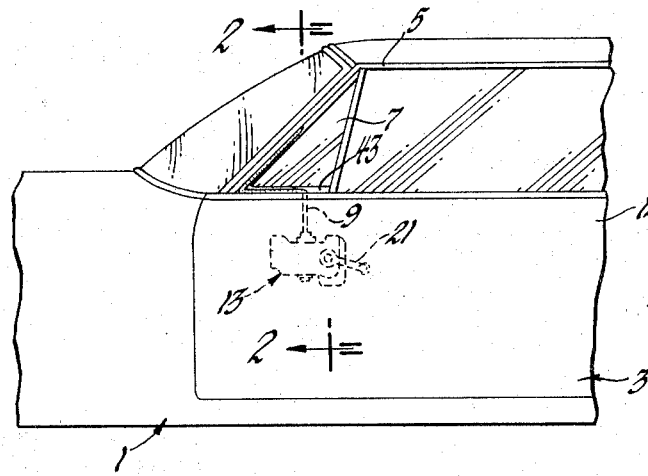
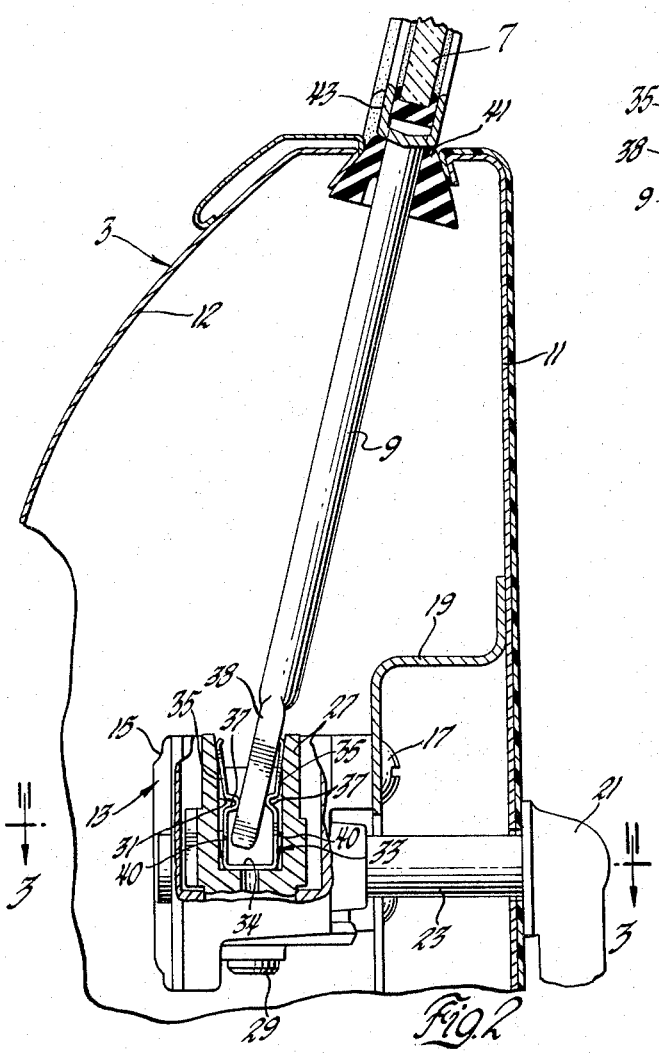
INVENTOR.
Bert R. Wanlass
BY
a. m. Heiter
ATTORNEY

3,295,390
DRIVE MECHANISM
Bert R. Wanlass, Warren, Mich., assignor to General Motors Corporation, Detroit, Mich., a corporation of Delaware
Filed June 10, 1964, Ser. No. 373,972
11 Claims. (Cl. 74—507)

This invention relates generally to drive mechanisms and more particularly to drive mechanisms for movable closures which incorporate universal type connections between the output of the drive mechanism and the structures being driven thereby.

It has previously been the general practice in the closure art to align the axis of rotatable elements connecting the closure to the drive mechanism with the axis of rotation of an output member forming part of the drive mechanism. For example, the pivotal axis of a vehicle ventilation window has heretofore usually been aligned with the vertical axis of rotation of the output gear of the ventilation window drive mechanism. This arrangment facilitates the assembly of the ventilation window on the vehicle door with a minimum expenditure of effort and use of parts. However, with the advent of curved ventilation windows which are usually mounted on pivots defining an inclined pivotal axis with respect to the drive mechanism output; this alignment becomes practically impossible without relocation or reorientation of the window drive mechanism. If not relocated the use of additional and relatively complex structure to operatively interconnect the curved ventilation window and the drive mechanism was heretofore necessary.

It is therefore an object of this invention to provide an improved drive mechanism for moving a closure member.

Another object of this invention is to provide connecting means between a drive mechanism and a movable closure member which permits misalignment between the axis of a member to operate the closure member and the axis of rotation of the output of the drive mechanism.

A further object of this invention is to provide a universal type connecting means for coupling a rotatable drive mechanism to a rotatable shaft in which the axis of the shaft intersects the rotational axis of the drive mechanism.

Another object of this invention is to provide a resilient connection between a rotatable output gear member of a drive mechanism and a rotatable pivot shaft of a rotatable closure member, such as a vehicle ventilation window, which is adapted to permit the angular misalginment of the pivot shaft and the axis of rotation of the output gear member.

Further objects and advantages of the drive mechanism of this invention will be readily apparent from the following specification and drawings wherein:

FIGURE 1 is a partial side-elevation view of a vehicle body having a ventilation window and a drive mechanism according to this invention;

FIGURE 2 is an enlarged sectional view taken on the plane indicated by line 2—2 of FIGURE 1, with parts broken away;

FIGURE 3 is a sectional view taken on the plane indicated by line 3—3 of FIGURE 2; and FIGURE 4 is a perspective view of a spring clip element in a relaxed position.

Referring now particularly to the drawing, FIGURE 1 shows a vehicle 1 having a hinged door 3 upon which a window frame 5 is mounted. A closure member such as a conventional curved ventilation window 7 is pivotally mounted to the window frame by an upper pivot (not shown) and to the door by a pivot or window drive shaft 9. As shown in FIGURE 2, the door includes an inner panel 11 and outer panel 12 while a drive mechanism 13 according to this invention is bolted at 17 to a bracket member 19 secured to the inner panel. The drive mechanism is adapted to be operated by a conventional crank handle 21. This handle is located adjacent to the inner panel is conventionally secured to the shaft 23 of a worm 25. The shaft 23 is journalled for rotation in the housing 15 of the drive mechanism as best shown in FIGURE 3. Also mounted in the housing is an output gear or worm wheel 27, rotatably mounted on shaft 29 in housing 15, having partial teeth which mesh with the worm to form a conventional reduction gear unit.

The worm wheel has a central recess or opening 31 which may be of any suitable configuration. The side walls defining the opening may, for example, be tapered slightly outwardly from the bottom of the opening or may be substantially straight with upper surfaces tapered outwardly as illustrated in FIG. 2. This opening is adapted to closely and completely receive a generally U-shaped, metallic spring clip element 33 shown in detail in FIG. 4.

The spring clip element has opposing spaced legs joined at their lower end by a flat base portion 34 adapted to be seated in the bottom of the opening 31. Formed centrally in and extending laterally across each leg is an elongated indentation 37 which is directed inwardly toward the opposite leg to form a pair of jaws 39.

Each leg also has a resilient retaining projection or finger 40 lanced outwardly therefrom. These projections extend upwardly and at an angle from the base portion 34 to provide retaining structure to securely hold the spring clip in the worm wheel. The opposing legs also have upper portions 35—35 above the indentations 37—37 which flare outwardly to generally conform to the upper sidewall configuration of the opening 31.

When installed into the opening 31 the retaining projections are deflected inwardly by the sidewalls defining the opening. The outward force exerted by the upper end portions of the loaded projections on the sidewalls firmly secures the clip in the opening. In the installed position upper portions 35—35 of the legs contact the tapering sidewalls of opening 31 while the central portions of the legs bow slightly inwardly away from the sidewalls as shown in FIG. 2.

Window drive shaft 9, which pivots the ventilation window to the door has a flattened end portion 38 adapted to be inserted into the jaws of the spring clip. When inserted, the jaws of the spring clip are deflected slightly outwardly until the upper portions closely engage the spaced tapering walls and exert a retaining force outwardly substantially perpendicular to the walls. Due to their conformation and resiliency the central portions of the legs can be moved further outwardly if necessary to accommodate the flattened end portion 38 of shaft 9.

It will thus be apparent that the clip is secured firmly in the opening 31 and that the pivot shaft is firmly gripped by the jaws of the spring clip. Furthermore, due to their resiliency these jaws can accommodate shaft ends portions which vary in size and which are not made to close tolerances.

The upper end of the window drive shaft extends through a conventional weather stripping 41 provided in the upper edge of the vehicle door and is rigidly connected to the rotatable ventilation window 7 by means of channel element 43. As best shown by FIGURE 2, it will be seen that the window drive shaft extends into the opening formed in the worm wheel at an angle to that wheel's rotational axis and is connected thereto by the jaws on the spring clip. The shaft 9, forming the lower pivot for the ventilation window is aligned with the upper pivot of the window. The axis of the window drive shaft intersects the axis of rotation of the worm wheel in the worm wheel opening 31. As shown in FIGURES 2 and 3, the opening 31 in the worm wheel has sufficient clearance to accommodate pivotal, sliding movement of the shaft in the jaws 39—39 of clip 33 as the worm wheel is turned from the illustrated position. The spring clip element and the worm wheel thus provide a universal type connection between the window drive shaft 9 and the worm 25. When the handle 21 is turned, the reduction gear unit is actuated and the rotating worm wheel rotates the window drive shaft. The shaft then moves the window between a closed position, as shown, and an open position transverse of the window frame, not shown.

This clip allows the misalignment of the pivot axis of the curved ventilation window and the rotation axis of the worm wheel and provides a highly efficient construction requiring a minimum number of parts and facilitates the assembly and disassembly of the curved ventilation window on the vehicle door.

Other spring clip forms and worm wheel openings (not shown) may be used to replace the particular spring clip and worm wheel opening illustrated and described in this specification. For example, the opening in the worm wheel may be defined by substantially straight sides and have an upper countersunk straight-sided opening communicating therewith, while the spring clip can be formed with substantially upwardly extending straight legs with jaws formed centrally therein and having outwardly offset portions at the upper ends thereof adapted to contact the walls of the countersink. This form of spring clip may also have retaining projections lanced outwardly from the legs thereof to secure the clip in the worm wheel opening therefor. In the installed position, the upper portions of this clip closely contact the opposed parallel walls of the countersink.

Thus, this invention provides an improved drive mechanism for closures, which has distinct advantages over the presently used and known drive mechanisms, which permits angular misalignment of an output gear and a closure operator shaft and which eliminates the requirement for relocation of the reduction gear unit.

The above-described embodiments are illustrative of the invention which it will be appreciated may be modified within the scope of the appended claims.

I claim:

1. A drive mechanism for a movable member including a drive shaft comprising, a reduction gear unit including an output gear having an axis of rotation and means turning said gear on its axis of rotation, said gear being formed with a recess therein receiving an end portion of said drive shaft, said drive shaft having an axis of rotation which intersects the axis of rotation of said gear, connecting means mounted in said opening slidably and pivotally connecting one end of said drive shaft to said gear, said gear and said connecting means providing a universal joint connecting said first mentioned means and said shaft thereby permitting said first mentioned means to turn said shaft on its axis of rotation.

2. A drive mechanism for a movable member including a shaft comprising, a reduction gear unit including an output gear having a recess therein receiving said shaft, resilient means in the recess connecting said output gear to the drive shaft, said resilient means permitting angular misalignment of the drive shaft and said output gear, said resilient means being formed by a spring clip generally U-shaped in cross section formed with opposed portions for gripping a portion of the drive shaft, said clip pivotally and slidably connecting said shaft to said output gear, said clip and said output gear providing a universal joint between said reduction gear unit and said shaft.

3. The device defined in claim 2 wherein said opposed portions extend substantially the width of said clip and are provided by inwardly extending projections formed in said clip.

4. A drive mechanism for a movable closure including a drive shaft rotatable about an axis comprising, a drive gear unit including an output gear rotatable about an axis of rotation, said output gear having a recess therein receiving said drive shaft, a clip formed with a pair of opposing jaws seated in said recess, said jaws receiving one end portion of said drive shaft, said clip rotating said drive shaft when said output gear is rotated, said shaft being slidably and pivotally mounted to said output gear by said jaws when rotated by said output gear, said clip permitting angular misalignment of the drive shaft and the output gear and said output gear and said clip cooperating to provide a universal mounting for said rotatable shaft.

5. The structure defined in claim 4 wherein the axis of rotation of said drive shaft intersects the axis of rotation of said output gear within the recess formed in said output gear.

6. The mechanism defined in claim 4 wherein said clip is generally U-shaped in cross section.

7. The mechanism defined in claim 6 wherein the end of said drive shaft gripped by said jaws is flat and wherein said jaws extend across the flattened surface of said shaft.

8. A window drive mechanism for a window rotatable about an inclined pivot axis in a vehicle door comprising, a housing mounted in the vehicle door, a worm gear journaled for rotation in said housing, control means for rotating said worm gear, a worm wheel mounted in said housing for rotation about a vertical axis, said worm wheel being rotatable by said worm gear, said worm wheel being formed with a recess therein, a resilient spring clip having opposing spaced legs mounted in the recess in the worm wheel, each of said legs being formed with an elongated indentation therein, said indentations forming opposed resilient jaws in said clip, a rotatable window drive shaft having an axis coinciding with the pivot axis of the window, one end of said shaft being formed with planar sides, said jaws gripping said planar sides of said shaft to rotate said shaft on rotation of said worm wheel.

9. A drive mechanism for a closure member rotatable about an inclined pivot axis comprising, a support for said closure member, a housing secured to said support, a reduction gear unit including a rotatable output gear having a recess therein mounted in said housing, a resilient metallic clip formed by spaced legs connected at the ends thereof by a base portion, said clip being seated in the recess in said output gear, said legs of said clip being formed with inwardly directed indentations therein to form a pair of jaws, said legs having upper portions which contact the upper walls of said output gear which form the recess therein, a pivot shaft for said closure member, said jaws receiving and gripping one end of said pivot shaft therebetween, said jaws moving outwardly toward the walls forming the opening in the output gear by one end of said pivot shaft when inserted therebetween, said clip permitting the axial misalignment of said pivot shaft and the axis of rotation of said output gear.

10. The drive mechanism according to claim 9 wherein said legs have outwardly extending resilient elongated projections which engage the walls forming the opening in said output gear to securely retain said clip in the opening in said output gear.

11. In a drive mechanism for a movable closure member, a drive shaft, a drive unit including an output having an axis of rotation and input means turning said output with respect to said axis of rotation, said output being formed with a recess therein receiving an end portion of said drive shaft, said drive shaft having an axis of rotation which intersects the axis of rotation of said output, connecting means mounted in said opening slidably and pivotally connecting one end of said drive shaft to said output, said output and said connecting means providing a universal joint connecting said first mentioned means and said shaft thereby permitting said first mentioned means to turn said shaft on its axis of rotation.

References Cited by the Examiner

UNITED STATES PATENTS

| | | | |
|---|---|---|---|
| 1,996,572 | 4/1935 | Field et al. | 49—337 |
| 2,100,232 | 11/1937 | Barry | 64—15 |
| 3,023,854 | 3/1962 | Lohr | 64—15 X |
| 3,187,521 | 6/1965 | Morris et al. | 64—27 X |

MILTON KAUFMAN, *Primary Examiner.*